United States Patent [19]

Bonk et al.

[11] 4,202,957
[45] May 13, 1980

[54] THERMOPLASTIC POLYURETHANE ELASTOMERS FROM POLYOXYPROPYLENE POLYOXYETHYLENE BLOCK COPOLYMERS

[75] Inventors: Henry W. Bonk, Wallingford, Conn.; Tilak M. Shah, S-Hertogenbosch, Netherlands

[73] Assignee: The Upjohn Company, Kalamazoo, Mich.

[21] Appl. No.: 572,741

[22] Filed: Apr. 29, 1975

Related U.S. Application Data

[63] Continuation-in-part of Ser. No. 504,183, Sep. 9, 1974, abandoned.

[51] Int. Cl.$^2$ .............................................. C08G 18/48
[52] U.S. Cl. ........................................ 528/77; 528/66
[58] Field of Search ............... 260/47 CB, 77.5 AP, 260/77.5 AM, 77.5 AN; 528/76, 77

[56] References Cited

U.S. PATENT DOCUMENTS

| | | | |
|---|---|---|---|
| 3,336,242 | 8/1967 | Hampson et al. | 260/77.5 AP |
| 3,380,967 | 4/1968 | Lowe et al. | 260/77.5 AP |
| 3,420,796 | 1/1969 | Matsubayashi et al. | 260/77.5 AP |

OTHER PUBLICATIONS

Saunders et al., Polyurethanes, Part I, Interscience, NY, p. 34, (1962).

Saunders et al., Polyurethanes, Part II, Interscience, NY, p. 307.

*Primary Examiner*—Lewis T. Jacobs
*Attorney, Agent, or Firm*—Denis A. Firth; John Kekich

[57] ABSTRACT

Polyurethane polyether-based elastomers are described which are thermoplastic, recyclable and have increased high temperature resistance which permits fabrication by injection molding. The elastomers are the product of reaction of 4,4′-methylenebis(phenyl isocyanate), a particular group of polypropylene oxide-polyethylene oxide block copolymers and an extender [straight chain aliphatic diols $C_{2-6}$ or the bis(2-hydroxyethyl ether) of hydroquinone or resorcinol]. The block copolymers have at least 50 percent primary hydroxyl groups, a pH in the range of 4.5 to 9, a content of alkali metal ion less than 25 ppm and a molecular weight of 1000 to 3000. The minimum ethylene oxide (E.O.) residue content (percent by weight) of the polyether for any molecular weight (M.W.) is governed by the equation:

$$\% \text{ E.O.} = \left[ \left( \frac{MW - 900}{4} \right) \times 3 \right] \times \left[ \frac{100}{MW} \right]$$

In a particularly preferred embodiment the elastomers are prepared by replacing up to 25 percent by equivalents of the extender by certain diols (polyethylene glycols up to 1500 M.W. preferred).

14 Claims, No Drawings

THERMOPLASTIC POLYURETHANE ELASTOMERS FROM POLYOXYPROPYLENE POLYOXYETHYLENE BLOCK COPOLYMERS

This application is a continuation-in-part of copending application Ser. No. 504,183, filed September 9, 1974, now abandoned.

BACKGROUND OF THE INVENTION

1. Field of the Invention

This invention relates to polyurethane elastomers and is more particularly concerned with thermoplastic polyurethane elastomers derived from polyether polyols and with methods for their preparation.

2. Description of the Prior Art

The preparation of thermoplastic polyurethane elastomers from polyester polyols is well-known in the art. Such elastomers can be extruded, injection molded and fabricated in other known manner without suffering any degradation due to momentary exposure to the relatively high processing temperatures (of the order of 400° F.) involved in such techniques. In contrast, it has not hitherto been possible to use polyethylene and polypropylene glycols to prepare thermoplastic polyurethanes, which can be molded by techniques involving processing temperatures of the above order. It is highly desirable that such polyurethanes be prepared since polyethylene and polypropylene glycols are significantly less expensive than polyester polyols and thereby would provide obvious economic advantages. The latter would be in addition to the recognized advantage in hydrolytic stability of the resulting polyurethanes, which hydrolytic stability is associated with the use of polyether polyols as opposed to polyester polyols.

Unfortunately it has been found hitherto that polyurethane elastomers prepared using polyether polyols, particularly polypropylene glycol, are not capable of withstanding exposure to temperatures of the order of 400° F. even for a brief period such as that required in injection molding and like techniques.

We have now found that, by using a particular group of block copolymer polyether glycols which have not hitherto been regarded as potential candidates for polyols in the preparation of polyurethane elastomers, it is possible to prepare thermoplastic polyurethane elastomers which will withstand temporary exposure for limited periods to temperatures as high as 450° F. These elastomers can be fabricated readily, without degradation, by extrusion, injection molding and the like. This finding results in marked advantages in terms of reduction in cost as well as the ability to use the more hydrolytically stable polyether based polyurethane elastomers for fabrication of articles by injection molding and the like.

SUMMARY OF THE INVENTION

This invention comprises thermoplastic recyclable polyurethane elastomers which are the product of reaction of:

(a) 4,4'-methylenebis(phenyl isocyanate), (b) a polyoxypropylene polyoxyethylene block copolymer having a molecular weight in the range of about 1000 to 3000, a pH within the range of 4.5 to 9, a primary hydroxyl content of not less than 50 percent, and a content of alkali metal ion not greater than 25 ppm, said block copolymer having a minimum content of ethylene oxide (E.O.) residues for any given molecular weight (M.W.) corresponding to:

$$\% \ E.O. = \left[\left(\frac{MW - 900}{4}\right) \times 3\right] \times \left[\frac{100}{MW}\right] \quad (I)$$

(c) an extender selected from the class consisting of aliphatic straight chain diols from 2 to 6 carbon atoms, inclusive, and the bis(2-hydroxyethyl)ethers of hydroquinone and resorcinol, and mixtures thereof.

The invention also comprises polyurethanes as defined above in which up to 25 percent, on an equivalent basis, of the extender is replaced by a diol selected from the class consisting of (i) branched chain aliphatic diols from 3 to 6 carbon atoms, (ii) diethylene glycol, dipropylene glycol, (iii) polyethylene glycols having a molecular weight from 200 to 1500, (iv) polycaprolactone diols having a molecular weight from 500 to 3000, (v) polypropylene glycols having a molecular weight from 400 to 1000 and (vi) polytetramethylene glycols having a molecular weight from 650 to 1500, and (vii) mixtures of two or more of said diols and glycols.

The polyurethane elastomers of the invention are thermoplastic and sufficiently resistant to temporary exposure to temperatures of the order of 400° F. as to permit fabrication by injection molding and like techniques into articles such as automobile parts and accessories, containers, tubing, and the like, for which only polyester-based polyurethane elastomers have been used heretofore. The polyurethane elastomers possess the hydrolytic stability commonly exhibited by polyether-based polyurethanes as well as excellent structural strength and stability characteristics. In addition the polyurethane elastomers of the invention are recyclable, i.e. when any article fabricated from said elastomers is found to be below specification for any reason, said article is not discarded but the material therein can be recycled by comminuting and remolding. Similarly, any scrap elastomer, such as flashing, generated in the molding process can be recycled and need not be discarded.

The term "aliphatic straight chain diols from 2 to 6 carbon atoms, inclusive," means diols of the formula $HO(CH_2)_nOH$ wherein n is 2 to 6 and there is no branching in the aliphatic chain separating the OH groups. The term is inclusive of ethylene glycol, 1,3-propanediol, 1,4-butanediol, 1,5-pentanediol and 1,6-hexanediol.

The term "branched chain aliphatic diols from 3 to 6 carbon atoms" means an aliphatic diol having the stated carbon atom content in which the hydrocarbon chain separating the two hydroxyl groups is branched, i.e. the chain is substituted by at least one alkyl group. The term is inclusive of 1,2-propanediol, 1,3-butanediol, 2,3-butanediol, 1,3-pentanediol, 1,2-hexanediol, 3-methylpentane-1,5-diol and the like.

The term "alkali metal ion" is inclusive of sodium, potassium, and lithium ions.

DETAILED DESCRIPTION OF THE INVENTION

The thermoplastic polyurethane elastomers of the invention can be prepared by processes which are conventional in the art for the synthesis of polyurethane elastomers. Such processes include the one-shot procedure in which all the reactants are brought together simultaneously, and the prepolymer procedure in which the isocyanate is reacted with the polyol in a first-step and the isocyanate-terminated prepolymer so produced is subsequently reacted with the extender. The one-shot process includes the process in which the diisocyanate has been converted to a quasi-prepolymer by reaction with a very minor (i.e. less than about 10 percent on an equivalent basis) of polyol prior to carrying out the polyurethane forming reaction. The on-shot is the preferred procedure for preparing the elastomeric polyurethanes of the invention. In a most preferred embodiment the elastomeric polyurethanes of the invention are prepared by a continuous one-shot procedure such as that set forth in U.S. Pat. No. 3,642,964.

The principal feature which distinguishes the elastomeric polyurethanes from prior elastomers lies in the employment of a particular group of polyether diols. The latter are polyoxypropylene polyoxyethylene block copolymeric glycols which are obtained by first polymerizing propylene oxide and then reacting the resulting polyoxypropylene glycol with ethylene oxide. The reactions in question are carried out in accordance with procedures well-known in the art; see, for example, U.S. Pat. No. 2,674,619 which gives specific details of procedures of this type. For example, the polymerization of the propylene oxide is effected by condensing propylene oxide with propylene glycol or water in the presence of a basic catalyst such as sodium hydroxide, potassium hydroxide and the like. The polymerization can be carried out to any desired extent depending upon the desired molecular weight of the ultimate product. The polypropylene oxide so obtained is then reacted with ethylene oxide, also in the presence of a basic catalyst if so desired.

The polyoxypropylene polyoxyethylene block copolymeric glycols of the invention meet a number of very specific requirements. The molecular weight thereof lies within the range of 1000 to 3000. The proportion of ethylene oxide residues in the block copolymers must exceed a certain minimum which varies depending upon the molecular weight of the block copolymer under consideration. Thus, for a copolymeric glycol having a given molecular weight (MW) the minimum amount, in percentage by weight, of ethylene oxide residues present in the glycol is given by the equation (I) supra. Illustratively, the following minimum amounts of ethylene oxide units in the glycol are called for by the equation (I) for various molecular weights within the above range.

| Molecular weight of glycol | % by weight of ethylene oxide |
|---|---|
| 1000 | 7.5 |
| 1200 | 18.75 |
| 1400 | 26.78 |
| 1600 | 32.81 |
| 1800 | 37.5 |
| 2000 | 41.25 |
| 2200 | 44.32 |
| 2400 | 46.87 |
| 2600 | 49.04 |
| 2800 | 50.89 |
| 3000 | 52.5 |

Further, whatever the molecular weight, the number of primary hydroxyl groups present in the block copolymeric glycols must be at least about 50 percent. The majority of the primary hydroxyl groups are those derived from the ethylene oxide residues but certain of the hydroxyl groups derived from propylene oxide can also be primary depending upon the manner in which the oxirane ring of the propylene oxide opened up in the polymerization. Accordingly, the percentage of primary hydroxyl groups present in a given block copolymeric glycol is not necessarily related directly to the amount of ethylene oxide residues which have been introduced. The two parameters, namely, the percentage of primary hydroxyl groups and the percentage by weight of ethylene oxide residues, are indicative of different characteristics of the block copolymeric glycols and are not merely different ways of expressing the same characteristic.

In order to be useful in preparing the elastomeric polyurethanes of the invention the block copolymeric glycols must be substantially free from any remaining traces of basic catalyst employed in their manufacture. By this is meant the following. Advantageously the pH of the glycols is within the range of 4.5 to 9.0 and, preferably, is within the range of 6.0 to 7.5. The amount of alkali metal ion present in the glycols is advantageously less than about 25 ppm and preferably less than about 5 ppm. Levels of alkali metal ion in excess of about 25 ppm give rise to undesirable results due to a significant level of trimerization of the diisocyanate during the polyurethane forming reaction.

In addition to meeting the above requirements, the polyoxypropylene polyoxyethylene block copolymers employed in preparing the polyurethane elastomers of the invention preferably also exhibit unsaturation of less than 0.06 milliequivalents/gram as measured by ASTM D 1638-60T and preferably also exhibit a peroxide content of less than 15 ppm.

The polyoxypropylene polyoxyethylene block copolymers described above have been employed hitherto as surfactants and cell control agents in polyurethane foam forming reactions. To the best of our knowledge it has not previously been suggested that these materials would be useful in the preparation of polyurethane elastomers. It has certainly not been suggested that these materials would give rise to polyurethane elastomers having the particularly useful properties described herein.

The various diols employed as extenders in the preparation of the polyurethane elastomers of the invention are well-known in the art as is the diisocyanate which is employed.

The proportions in which the diisocyanate, the polyoxypropylene polyoxyethylene block copolymers, and the extender are employed in the preparation of polyurethane elastomers of the invention are such that the ratio of equivalents of isocyanate to total equivalents of hydroxyl groups in the reaction mixture is within the range of about 1:0.96 to about 1:1.10. The relative proportions of polyoxypropylene polyoxyethylene block copolymer to extender can vary over a wide range depending upon the molecular weight of the copolymer. In general the proportion of equivalents of copolymer to equivalents of extender is within the range of about 1:1 to about 1:12. It is found that the higher proportions of extender are desirable for the higher molecular weight copolymers.

The hardness of the polyurethane elastomers of the invention lies within the range of about 60 Shore A to about 80 Shore D. In general, hardness is a function of the molecular weight of the polyoxypropylene polyoxyethylene copolymer; for any given ratio of equivalents of extender and copolymer it is found that the higher the molecular weight of the copolymer the softer the elastomer.

As set forth above, the polyurethane elastomers of the invention are preferably made by the one-shot procedure and most preferably by a continuous one-shot procedure. In such procedures the reactants are brought together in any order. Advantageously, the polyols, i.e. the polyoxypropylene polyoxyethylene block copolymer and the extender(s), are preblended and fed to the reaction mixture as a single component, the other major component being the diisocyanate (or quasi-prepolymer where used). The mixing of the reactants can be accomplished by any of the procedures and apparatus conventional in the art. Preferably the individual components are rendered substantially free from the presence of extraneous moisture using conventional procedures; for example, by azeotropic distillation using benzene, toluene, and the like, or by heating under reduced pressure at a temperature above the boiling point of water at the pressure employed.

The mixing of the reactants can be carried out at ambient temperature (of the order of 25° C.) and the resulting mixture is then heated to a temperature of the order of about 40° C. to about 130° C., preferably to a temperature of about 90° C. to about 120° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before the reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20° C. to about 115° C. The time required for curing will vary the temperature of curing and also with the nature of the particular composition. The time required in any given case can be determined by a process of trial and error.

It is frequently desirable but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228-232; see also Britain et al., J. Applied Polymer Science, 4, 207-211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin diluarate, and the like. Representative tertiary organic amine catalysts are triethylamine, triethylenediamine, N,N,N'N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

When the compositions of the invention are prepared by the less preferred prepolymer method, the diisocyanate and the polyoxypropylene polyoxyethylene glycol are reacted, if desired, in the presence of a catalyst as defined above, in a preliminary stage to form an isocyanate-terminated prepolymer. The proportions of diisocyanate and polyoxypropylene polyoxyethylene glylcol employed in the preparation of this prepolymer are consistent with the ranges defined above. The diisocyanate and the polyoxypropylene polyoxyethylene glycol are preferred render substantially free from the presence of extraneous moisture, using the methods described above, before the formation of the prepolymer is carried out. The formation of the prepolymer is advantageously carried out at a temperature within the range of about 70° C. about 130° C. under an inert atmosphere such as nitrogen gas in accordance with conventional procedures. The prepolymer so formed can then be reacted, at any desired time, with the extender diol to form the elastomers of the invention. This reaction is carried out advantageously within the range of reaction temperatures specified above for the one-shot procedure. In general, the prepolymer and the extender are mixed and heated within the requisite temperature range while the mixture is degassed as described previously. The degassed mixture is then transferred to a suitable mold, extrusion apparatus, or the like, and cured as described for the one-shot procedure.

If desired, the elastomers of the invention can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

In a particular embodiment of the invention it is found that up to about 25 percent, based on equivalents, of the extender (c) can be replaced by a different diol without affecting the highly desirable properties of the elastomers of the invention. On the contrary, such replacement confers enhanced resistance to high temperatures on the polyurethane elastomers of the invention without detracting from the other desirable properties. Illustrative of the diols which are used to replace a proportion of the extender (c) in the above manner are: diethylene glycol, dipropylene glycol; branched chain aliphatic diols from 3 to 6 carbon atoms, such as 1,2-propylene glycol, 1,3-butanediol, and 3-methyl-1,5-pentane diol; N-methyldiethanolamine, N-ethyldiethanolamine; polyethylene glycols having molecular weights in the range of 200 to 1500; polypropylene glycols having a molecular weight from 400 to 1000, polytetramethylene glycols having a molecular weight from 650 to 1500; and polycaprolactone diols having a molecular weight in the range of 500 to 3000.

In a preferred group of elastomers of the invention the extender (c) is 1,4-butanediol of which from 3% to 10%, on an equivalent basis, has been replaced by dipropylene glycol, diethylene glycol, 3-methyl-1,5-pentanediol, polyethylene glycol having a molecular weight of about 400 or mixtures thereof.

Where part of the extender (c) is replaced by another diol as described above, the latter can be added to the polyurethane forming reaction mixture as a separate component or can be preblended with the polyol components as described previously.

The following examples describe the manner and process of making and using the invention and set forth the best mode contemplated by the inventors of carrying out the invention but are not to be construed as limiting.

EXAMPLE 1

A series of polyurethane elastomers was prepared, using a standard procedure throughout, from a number of different polyoxypropylene polyoxyethylene block copolymers having varying ethylene oxide contents and primary hydroxyl contents but all having a molecular weight of 2000. The ethylene oxide content of all the polyols was determined by nuclear magnetic resonance spectroscopy as described in Dow Chemical Company Bulletin Method TC-AM-66-23 dated May 23, 1966. In all cases the polyisocyanate used was 4,4'-methylenebis(phenyl isocyanate) and the extender was 1,4-butanediol. The procedure for preparation of the elastomers was as follows:

The polyoxypropylene polyoxyethylene block copolymer was degassed by heating under reduced pressure at 110° C. for 30 minutes. To the resulting material was added the 1,4-butanediol and the mixture so obtained was again degassed at 110° C. under reduced pressure for 30 minutes. To the resulting product, still at 110° C., was added 0.024 percent (by weight of total reactants) of stannous octoate followed by the 4,4'-methylenebis(phenyl isocyanate). The mixture so obtained was subjected to high speed mechanical stirring for 15 seconds and then poured into a shallow aluminum tray. The poured elastomer and tray were allowed to stand at room temperature (circa 20° C.) for 24 hours. Thereafter the elastomer was chopped into pieces, granulated and dried for 3 hours at 110° C. The dried material was then injection molded to form a sheet (4.5×4.5×1/16") for test purposes. The resulting sheet was postcured for 16 hours at 115° C. followed by 7 days at room temperature (circa 20° C.). The cured elastomer was then subjected to physical testing.

In Table I below are recorded the proportions (in moles) of ingredients employed in preparing the various elastomers in accordance with the above process together with physical properties of the postcured pressed sheets derived from those elastomers which could be molded. The Table also records the behaviour of the various elastomers subjected to molding temperatures from 350° F. to 450° F. In the case of Elastomers A-D, all of which are outside the scope of the invention, molding was not possible because of degradation at the molding temperatures.

TABLE I

| Elastomer | A | B | C | D | E | F | G | H | I |
|---|---|---|---|---|---|---|---|---|---|
| Polyol | 1 | 2 | 3 | 4 | 5 | 6 | 6 | 7 | 8 |
| % E.O. | 0 | 10 | 12 | 11.16 | 46 | 47 | 47 | 27 | 10 |
| % Primary OH | 8 | 63 | 52 | 53 | 81 | 84 | 84 | 75 | 63 |
| Metal ppm | — | — | 75 | — | >15 | <15 | <15 | — | — |
| pH | 7 | 7 | 7.8 | 8.7 | 7 | 7 | 7 | 7 | 7 |
| Proportions (molar) | | | | | | | | | |
| MDI | 5.94 | 5.94 | 5.94 | 5.94 | 5.94 | 5.94 | 5.94 | 4.45 | 3.46 |
| Polyol | 1 | 1 | 1 | 1 | 1 | 1 | 1 | 1 | 1 |
| 1,4-butanediol | 5 | 5 | 5 | 5 | 5 | 5 | 4.5 | 3.5 | 2.5 |
| Dipropylene glycol | — | — | — | — | — | — | 0.5 | — | — |
| NCO/OH | 0.99 | 0.99 | 0.99 | 0.99 | 0.99 | 0.99 | 0.99 | 0.99 | 0.99 |
| Molding Temperature (°F.) (time of exposure) | | | | | | | | | |
| 350 | d | d | d | OK | OK | OK | OK | OK | OK |
| 380 | e | e | e | OK | ↓ | ↓ | ↓ | ↓ | ↓ |
| 390 | g | g | g | d | ↓ 5 min. | ↓ 15 min. | ↓ 20 min. | ↓ 10 min. | ↓ 10 min. |
| 400 | r | r | r | e | ↓ at | ↓ at | ↓ at | ↓ at | ↓ at |
| 410 | a | a | a | g | ↓ 420° F. | ↓ 420° F. | ↓ 420° F. | ↓ 420° F. | ↓ 420° F. |
| 420 | d | d | d | r | ↓ | ↓ | ↓ | ↓ | ↓ |
| 440 | e | e | e | a | ↓ | ↓ | ↓ | ↓ | ↓ |
| 450 | s | s | s | d e s | ↓ | ↓ | ↓ | ↓ | ↓ |
| Properties | | | | | | | | | |
| Hardness | — | — | — | — | 44D | 43D | — | 92A | 90A |
| Modulus psi | | | | | | | | | |
| 50% | — | — | — | — | 1120 | 900 | — | .790 | 730 |
| 100% | — | — | — | — | 1410 | 1010 | — | 1010 | 910 |
| 300% | — | — | — | — | 2550 | 1820 | — | 1200 | 1180 |
| Tensile Strength: psi | — | — | — | — | 5120 | 4610 | — | 3240 | 2950 |
| Elongation at break: % | — | — | — | — | 510 | 550 | — | — | — |
| Compression set: % | — | — | — | — | 26.3 | 30.5 | — | — | — |
| Clash-Berg Modulus T$_f$°C. | — | — | — | — | −41 | −40 | — | — | — |

Identity of polyols used in Elastomers of Table I (All polyols derived by reacting a polyoxypropylene glycol with the appropriate quantity of ethylene oxide):

| Polyol | | |
|---|---|---|
| 1 : P2010 | Union Carbide |
| 2 : L61 | Wyandotte |
| 3 : X423 | Olin |
| 4 : XD8379 | Dow |
| 5 : L44 | Wyandotte |
| 6 : X-427 | Olin |
| 7 : L-42 | Wyandotte |
| 8 : L-31 | Wyandotte |

Polyol 5 was treated by filtration through Brightsorb clay before use.

EXAMPLE 2

Using the same standard procedure described in Example 1 a series of elastomers was prepared with a varying ratio of polyol to 1,4-butanediol extender, using as the polyol in all cases the polyoxypropylene polyoxyethylene copolymer having a molecular weight of 2200, an ethylene oxide content of 46% by weight, a primary hydroxyl content of 81%, an alkali metal content of circa 10 and a pH of 7. The proportions (moles) of ingredients and properties of the elastomers are summarized in Table II. Each of the elastomers could be maintained at the molding temperature of 420° F. for 10 minutes without showing any sign of degradation.

TABLE II

| Elastomer | J | K | L | M | N |
|---|---|---|---|---|---|
| MDI | 4.08 | 5.10 | 6.12 | 7.14 | 8.16 |
| Polyol | 1 | 1 | 1 | 1 | 1 |
| 1,4-butanediol | 3 | 4 | 5 | 6 | 7 |
| NCO/OH | 1.02 | 1.02 | 1.02 | 1.02 | 1.02 |
| Molding temp. °F. | 420 | 420 | 430 | 440 | 440 |
| Hardness | | | | | |
| Shore A | 76 | 84 | 88 | 92 | 92 |
| Shore D | 25 | 31 | 39 | 42 | 45 |
| Modulus: psi | | | | | |
| 100% | 510 | 760 | 1000 | 1250 | 1510 |
| 200% | 710 | 1000 | 1290 | 1630 | 1910 |
| 300% | 900 | 1210 | 1620 | 2040 | 2560 |
| Tensile Strength psi | 2470 | 2890 | 3930 | 5030 | 5580 |
| Elongation at break % | 940 | 870 | 730 | 710 | 630 |
| Tensile set at break: % | 170 | 180 | 140 | 140 | 120 |
| Tear Strength: Die C: psi | 440 | 480 | 610 | 670 | 720 |
| Compression set: % | 40.3 | 41.2 | 35.7 | 40.8 | 41 |
| Clash-Berg modulus, $T_f$, °C. | −56 | −53 | −49 | −46 | −42 |

EXAMPLE 3

A series of elastomers was prepared, using the procedure described in Example 1, from 4,4'-methylenebis(phenyl isocyanate) (MDI), the polyoxypropylene polyoxyethylene glycol identified as Polyol 6 in Example 1, and 1,4-butanediol, but replacing 5 percent, on an equivalent basis, of the butanediol by a second diol extender. The proportions (moles) of ingredients, and the properties of the resulting elastomers (after curing as described in Example 1) are set forth in Table III below.

TABLE III

| Elastomer | O | P | Q |
|---|---|---|---|
| MDI | 6.12 | 6.12 | 6.12 |
| Polyol 6 | 1 | 1 | 1 |
| 1,4-butanediol | 4.75 | 4.75 | 4.75 |
| dipropylene glycol | 0.25 | — | — |
| diethylene glycol | — | 0.25 | — |
| 3-methyl-1,5-pentanediol | — | — | 0.25 |
| NCO/OH | 1.02 | 1.02 | 1.02 |
| Properties | | | |
| Hardness | | | |
| Shore A | 82 | 86 | — |
| Shore D | 40 | 40 | — |
| Modulus psi | | | |
| 50% | 780 | 900 | 800 |
| 100% | 1170 | 1270 | 1200 |
| 300% | 2510 | 2340 | 2150 |
| Tensile strength: psi | 5250 | 4370 | 4250 |

EXAMPLE 4

A series of elastomers was prepared, using the procedure described and ingredients in Example 1 but replacing 1,4-butanediol by varying amounts of bis(2-hydroxyethyl ether) of hydroquinone as extender and using as the polyoxypropylene polyoxyethylene glycol, one having a % E.O. content of 52, a % primary hydroxyl content of 83, and a pH of 7 [L-35: Wyandotte]. The proportions (moles) of ingredients and properties of the elastomers (after curing as described in Example 1) are set forth in Table IV below.

TABLE IV

| Elastomer | R | S | T |
|---|---|---|---|
| MDI | 2.575 | 3.605 | 4.635 |
| Polyoxypropylene polyoxyethylene glycol | 1 | 1 | 1 |
| Bis(2-hydroxyethyl ether)-hydroquinone | 1.5 | 2.5 | 3.5 |
| NCO/OH | 1.03 | 1.03 | 1.03 |
| Properties | | | |
| Hardness | | | |
| Shore A | 80 | 90 | 94 |
| Shore D | — | 42 | 50 |
| Modulus psi | | | |
| 50% | 500 | 900 | 1200 |
| 100% | 700 | 1200 | 1600 |
| 300% | 1000 | 1700 | 2390 |
| Tensile strength: psi | 2850 | 3200 | 3250 |

EXAMPLE 5

Using the procedure described in Example 1, an elastomer was prepared from the following ingredients and proportions (all proportions in moles):

| MDI | : 7.55 moles |
|---|---|
| Polyol[1] | : 1.0 mole |
| 1,4-butanediol | : 6.0 moles |
| Polyethylene glycol (M.W. = 400) | : 0.4 mole |
| NCO/OH = 1.02:1 | |

[1] Same as Polyol 5 (Example 1)

The elastomer, after forming into pressed sheets and curing as described in Example 1, was found to have the following properties:

| Density | : | 1.185 g/cc. |
|---|---|---|
| Shore D Hardness | : | 40 |
| Modulus psi | : | |
| at 100% | | 1290 |
| 300% | | 2240 |
| Tensile Strength: psi | | 5540 |
| Elongation at break % | | 480 |
| Elongation set % | | 55 |
| Compression set % | | 33 |
| Clash-Berg Modulus $T_f$°C. | : | −37 |

The elastomer was injection molded to form the pressed sheet for testing purposes and showed no tendency to degrade in the molding process.

EXAMPLE 6

Using the procedure described in Example 1, an elastomer was prepared from the following ingredients and proportions (in moles):

| MDI | : 7.45 moles |
|---|---|
| Polyol[1] | : 1.0 mole |
| 1,4-butanediol | : 6.0 moles |
| Polyethylene glycol (M.W. = 400) | : 0.3 mole |
| NCO/OH = 1.02:1 | |

[1] Same as Polyol 6 (Example 1)

The elastomer, after forming into pressed sheets by injection molding and curing as described in Example 1, was found to have the following properties:

| Shore A Hardness | : | 90 |
|---|---|---|
| Modulus psi | | |

| | | |
|---|---|---|
| at 50% | : | 1140 |
| 100% | : | 1350 |
| 200% | : | 1850 |
| 300% | : | 2380 |
| Tensile Strength: psi | : | 5460 |
| Elongation at break % | : | 540 |
| Elongation set % | : | 60 |
| Compression set % | : | 26 |

The elastomer showed no sign of degradation on being injection molded.

EXAMPLE 7

Using the procedure described in Example 1, an elastomer was prepared from the following ingredients and proportions (moles):

| | | |
|---|---|---|
| MDI | : | 4.08 moles |
| Polyol[1] | : | 0.75 mole |
| 1,4-butanediol | : | 3.0 moles |
| Polyethylene glycol (M.W. = 1000) | : | 0.25 mole |
| NCO/OH = 1.02:1.0 | | |

[1]:Same as Polyol 6 (Example 1)

The elastomer, after forming into pressed sheets by injection molding and curing as described in Example 1, was found to have the following properties:

| | | |
|---|---|---|
| Density | : | 1.169 g/cc. |
| Shore A Hardness | : | 80 |
| Modulus psi | | |
| at 50% | : | 460 |
| 100% | : | 670 |
| 200% | : | 960 |
| 300% | : | 1250 |
| Tensile Strength: psi | : | 4250 |
| Elongation at break % | : | 730 |
| Tensile set % | : | 90 |
| Compression set % | : | 23 |
| Clash-Berg Modulus $T_f$ °C. | : | −48 |

The elastomer showed no sign of degradation on being injection molded.

EXAMPLE 8

An elastomer was prepared exactly as described in Example 7 except that the proportion of 1,4-butanediol to polyol was increased as follows:

| | | |
|---|---|---|
| MDI | : | 6.12 |
| Polyol 6 | : | 0.75 |
| 1,4-butanediol | : | 5.0 |
| Polyethylene glycol (M.W. = 1000) | : | 0.25 |

The elastomer, in the form of injection molded sheets as described in Example 1, was found to have the following properties:

| | | |
|---|---|---|
| Density | : | 1.196 g/cc. |
| Shore A Hardness | : | 90 |
| Modulus psi | | |
| at 50% | : | 1040 |
| 100% | : | 1400 |
| 200% | : | 1920 |
| 300% | : | 2540 |
| Tensile Strength: psi | : | 5410 |
| Elongation at break % | : | 520 |
| Elongation set % | : | 60 |
| Tear Strength: pli | : | 910 |
| Compression set % | : | 29 |
| Clash-Berg Modulus $T_f$ °C. | : | −39 |

The stability of the above elastomer to processing temperatures of 400° F. encountered in injection molding was determined using a Monsanto Rheometer in which a charge of the elastomer was maintained at 400° F. in the extruder barrel and, at intervals of five minutes, a fixed amount of material was extruded from the orifice under pressure of 90 psig and the time taken to extrude this fixed amount of material was determined. The following results were recorded:

| Elapsed time | Time taken to extrude fixed amount |
|---|---|
| 5 mins. | 0.225 minutes |
| 10 mins. | 0.201 minutes |
| 15 mins. | 0.195 minutes |
| 20 mins. | 0.255 minutes |

The above results indicate stability of the material to processing under extrusion conditions.

EXAMPLE 9

Using the procedure described in Example 1, an elastomer was prepared from the following ingredients and proportions (moles):

| | | |
|---|---|---|
| MDI | : | 12.12 moles |
| Polyol 5 (see Example 1) | : | 1.0 mole |
| 1,4-butanediol | : | 10.0 moles |
| Polyethylene glycol (M.W. = 1500) | : | 1.0 mole |
| NCO/OH = 1.01/1.0 | | |

The elastomer, after forming into pressed sheets by injection molding and curing as described in Example 1, was found to have the following properties:

| | | |
|---|---|---|
| Hardness: Shore A | : | 90 |
| Modulus psi | | |
| at 50% | : | 890 |
| 100% | : | 1140 |
| 200% | : | 1490 |
| 300% | : | 1980 |
| Tensile Strength: psi | : | 4490 |
| Elongation at break % | : | 660 |
| Tensile set % | : | 130 |
| Compression set % | : | 37 |
| Clash-Berg Modulus $T_f$ °C. | : | −45 |

The above elastomer showed no sign of degradation when injection molded to form the pressed sheets for determination of the above properties.

EXAMPLE 10

Using the procedure described in Example 1, an elastomer was prepared from the following ingredients and proportions (moles):

| | | |
|---|---|---|
| MDI | : | 4.2 moles |
| Polyol 6 (see Example 1) | : | 1.0 mole |
| Bis(2-hydroxyethyl)ether of resorcinol | : | 3.0 moles |

-continued

NCO/OH = 1.05/1.0

The elastomer so obtained was injection molded, without showing any sign of degradation, to form pressed sheets which were cured as described in Example 1 and then found to have the following properties:

| Density | : | 1.18 g/cc. |
|---|---|---|
| Hardness: Shore A | : | 89 |
| Tensile Modulus psi | : | |
| at 50% | : | 900 |
| 100% | : | 1190 |
| 300% | : | 1570 |
| Tensile Strength, psi | : | 2630 |
| Elongation at break % | : | 690 |
| Tensile set % | : | 90 |
| Compression set % | : | 23 |

EXAMPLE 11

Using the procedure described in Example 1, an elastomer was prepared from the following ingredients and proportions (moles):

| MDI | : | 8.91 moles |
|---|---|---|
| Polyol[1] | : | 1.0 mole |
| 1,4-butanediol | : | 7.14 moles |
| Polycaprolactone diol (M.W. = 2000) | : | 0.43 mole |
| NCO/OH = | | 1.04/1.0 |

[1]polyoxypropylene polyoxyethylene glycol having 52% E.O. residues, 83% primary hydroxyl and pH = 7 [L-35: Wyandotte].

The elastomer so obtained was injection molded, without showing any sign of degradation, to form pressed sheets which were cured as described in Example 1 and then found to have the following properties:

| Hardness: Shore D | : | 39 |
|---|---|---|
| Modulus, psi | : | |
| at 50% | : | 1050 |
| 100% | : | 1320 |
| 300% | : | 2260 |
| Tensile Strength, psi | : | 5660 |
| Elongation % | : | 630 |
| Tensile set % | : | 80 |
| Compression set % | : | 43 |

EXAMPLE 12

Using the procedure described in Example 1, two elastomers were prepared in which a minor part of the 1,4-butanediol extender was replaced by polytetramethylene glycol (PTMG) having a molecular weight of 1000 (Teracol 1000). The ingredients and molar proportions were as follows:

| Elastomer | U | V |
|---|---|---|
| MDI | 7.58 | 6.93 |
| Polyol 6 (see Example 1) | 1.0 | 1.0 |
| 1,4-butanediol | 6.25 | 5.55 |
| PTMG | 0.25 | 0.11 |
| NCO/OH | 1.01/1.0 | 1.04/1.0 |

The two elastomers were injection molded, without showing any signs of degradation, to form pressed sheets which were cured as described in Example 1 and then found to have the following properties:

| Elastomer | U | V |
|---|---|---|
| Density, g/cc. | 1.18 | 1.18 |
| Hardness: Shore A | 88 | 87 |
| Modulus, psi | | |
| at 50% | 920 | 920 |
| 100% | 1340 | 1180 |
| 200% | 1930 | 1530 |
| 300% | 2660 | 1900 |
| Tensile Strength, psi | 5790 | 4930 |
| Elongation at break % | 480 | 640 |
| Tensile set % | 50 | — |
| Elongation set % | — | 110 |
| Die C Tear Strength, psi | 710 | — |
| Compression set % | 27 | 32.5 |
| Clash-Berg Modulus $T_f$ °C. | −38.5 | −44 |

EXAMPLE 13

Using the procedure described in Example 1, an elastomer was prepared in which a minor part of the 1,4-butanediol extender was replaced by polypropylene glycol (PPG) of molecular weight 1025. The ingredients and molar proportions are as follows:

| MDI | : | 6.86 |
|---|---|---|
| Polyol 6 (see Example 1) | : | 1.0 |
| 1,4-butanediol | : | 5.55 |
| PPG | : | 0.11 |
| NCO/OH | : | 1.03/1.0 |

The elastomer was injection molded, without showing any signs of degradation, to form a pressed sheet which was cured as described in Example 1 and then found to have the following properties:

| Density, g/cc. | : | 1.18 |
|---|---|---|
| Hardness: Shore A | : | 87 |
| Modulus, psi | | |
| at 50% | : | 910 |
| 100% | : | 1200 |
| 200% | : | 1600 |
| 300% | : | 2100 |
| Tensile Strength, psi | : | 5210 |
| Elongation at break % | : | 590 |
| Tensile set % | : | 90 |
| Compression set % | : | 31 |
| Clash-Berg Modulus $T_f$ °C. | : | −42 |

We claim:
1. A thermoplastic, recyclable polyurethane elastomer which is the product of reaction of
   (a) 4,4′-methylenebis(phenyl isocyanate),
   (b) a polyoxypropylene polyoxyethylene block copolymer having a molecular weight in the range of about 1000 to 3000, a pH within the range of 4.5 to 9, a primary hydroxyl content of not less than 50 percent and a content of alkali metal ion not greater than 25 ppm, said block copolymer having a minimum content of ethylene oxide (E.O.) residues for any given molecular weight (MW) corresponding to:

$$\% \text{ E.O.} = \left[\left(\frac{MW - 900}{4}\right) \times 3\right] \times \left[\frac{100}{MW}\right]$$

(c) an extender consisting of from 75 to 100 percent, on an equivalent basis, of a member selected from the class consisting of aliphatic straight chain diols having from 2 to 6 carbon atoms, inclusive, and the bis(2-hydroxyethyl)ethers of hydroquinone and resorcinol, and mixtures thereof and from 25 to 0 percent by equivalents of a member selected from the class consisting of (i) branched chain aliphatic diols from 3 to 6 carbon atoms, (ii) diethylene glycol and dipropylene glycol, (iii) polyethylene glycols having a molecular weight from 200 to 1500, (iv) polycaprolactone diols having a molecular weight from 500 to 3000, (v) polypropyelene glycols having a molecular weight from 400 to 1000, (vi) polytetramethylene glycols having a molecular weight from 650 to 1500 and (vii) mixtures of two or more of said diols or glycols;

the molar proportions of said block copolymer (b) to said extender (c) being within the range of about 1:1 to 1:12, and the ratio of equivalents of isocyanate to total equivalents of hydroxyl groups being within the range of about 1:0.96 to about 1:1.10.

2. A thermoplastic, recyclable polyurethane elastomer according to claim 1 wherein the extender is 1,4-butanediol.

3. The thermoplastic, recyclable polyurethane elastomer according to claim 1 wherein the extender is a mixture comprising from 100 to 75 percent, on an equivalent basis, of 1,4-butanediol and from 0 to 25 percent by equivalents of dipropylene glycol.

4. A thermoplastic, recyclable polyurethane elastomer according to claim 1 wherein the extender is a mixture comprising from 100 to 75 percent, on an equivalent basis, of 1,4-butanediol and from 0 to 25 percent by equivalents of polyethylene glycol having a molecular weight of about 400.

5. A thermoplastic, recyclable, polyurethane elastomer according to claim 1 wherein the polyoxypropylene polyoxyethylene block copolymer has a molecular weight of about 2000 and a minimum of 41.25 percent by weight of ethylene oxide residues.

6. A thermoplastic, recyclable, polyurethane elastomer which is the product of reaction of:
(a) 4,4'-methylenebis(phenyl isocyanate);
(b) a polyoxypropylene polyoxyethylene block copolymer having a molecular weight in the range of about 2000, a pH within the range of 6.0 to 7.5, a primary hydroxyl content of not less than 50 percent, a content of alkali metal ion not greater than 25 ppm, a minimum content of ethylene oxide residues of 40%; and
(c) an extender consisting of from 75 to 100 percent, on an equivalent basis, of 1,4-butanediol, and from 25 to 0 percent by equivalents of a member selected from the class consisting of (i) branched chain aliphatic diols from 3 to 6 carbon atoms, (ii) diethylene glycol and dipropylene glycol, (iii) polyethylene glycols having a molecular weight from 200 to 1500, (iv) polycaprolactone diols having a molecular weight from 500 to 3000, (v) polypropylene glycols having a molecular weight from 400 to 1000, (vi) polytetramethylene glycols having a molecular weight from 650 to 1500 and (vii) mixtures of two or more of said diols or glycols.

7. A thermoplastic, recyclable, polyurethane elastomer according to claim 7 wherein up to 25% of the 1,4-butanediol is replaced by an equivalent amount of dipropylene glycol.

8. A thermoplastic, recyclable, polyurethane elastomer according to claim 7 wherein up to 25% of the 1,4-butanediol is replaced by an equivalent amount of diethylene glycol.

9. A thermoplastic, recyclable, polyurethane elastomer according to claim 7 wherein up to 25% of the 1,4-butanediol is replaced by an equivalent amount of polyethylene glycol of molecular weight of about 400.

10. A thermoplastic, recyclable, polyurethane elastomer according to claim 7 wherein up to 25% of the 1,4-butanediol is replaced by an equivalent amount of 3-methyl-1,5-pentanediol.

11. A thermoplastic, recyclable, polyurethane elastomer which is the product of reaction of:
(a) 4,4'-methylenebis(phenyl isocyanate);
(b) a polyoxypropylene polyoxyethylene block copolymer having a molecular weight in the range of about 2000, a pH within the range of 6.0 to 7.5, a primary hydroxyl content of not less than 50 percent, a content of alkali metal ion not greater than 25 ppm, a minimum content of ethylene oxide residues of 40%; and
(c) bis(2-hydroxyethyl ether) of hydroquinone, the molar proportions of (b) to (c) being within the range of about 1:1 to 1:12, and the ratio of equivalents of isocyanate to total equivalents of hydroxyl groups being within the range of about 1:0.96 to about 1:1.10.

12. A thermally stable polyurethane elastomer which is a reaction product of (a) a poly(oxypropylene)-poly(oxyethylene) glycol of molecular weight from about 1000 to about 3000 and containing 15 to 50% by weight of oxyethylene groups (b) methylenebis(4-phenylisocyanate) and (c) 1,4-butanediol; the NCO/OH equivalents ratio being from 0.96 to 1.10 and the molar ratio of (c) to (a) being from 1/1 to 12/1, said elastomer having a hardness of about 40 to 55 Shore D, an elongation of greater than 270%, an ultimate tensile strength of at least 2700 psi and a Die C tear strength of at least 500 pli, said elastomer displaying improved thermal stability as evidenced by its ability to retain at least twice as much of its original tensile strength, after exposure to a temperature of 415° F. for 20 minutes, as an otherwise similar elastomer in which (a) contains 10% or less oxyethylene groups.

13. A thermally stable polyurethane elastomer as in claim 13 in which the molecular weight of (a) is about 2000 and the oxyethylene group content is 30–45%.

14. A shaped article prepared from the thermally stable polyurethane elastomer of claim 13.

UNITED STATES PATENT OFFICE
CERTIFICATE OF CORRECTION

Patent No. 4,202,957                    Dated May 13, 1980

Inventor(s) Henry W. Bonk and Tilak M. Shah

It is certified that error appears in the above-identified patent and that said Letters Patent are hereby corrected as shown below:

| | |
|---|---|
| Column 3, line 8: | Should read: |
| on-shot | one-shot |
| Column 5, line 39: | Should read: |
| vary the | vary with the |
| Column 6, line 13: | Should read: |
| preferred render | preferably rendered |
| Column 6, line 18: | Should read: |
| 70°C about | 70°C to about |
| Column 16, Claim 7, line 6: | Should read: |
| claim 7 | claim 6 |
| Column 16, Claim 8, line 10: | Should read: |
| claim 7 | claim 6 |
| Column 16, Claim 9, line 14: | Should read: |
| claim 7 | claim 6 |
| Column 16, Claim 10, line 18: | Should read: |
| claim 7 | claim 6 |

UNITED STATES PATENT OFFICE
CERTIFICATE OF CORRECTION

Patent No. 4,202,957    Dated May 13, 1980

Inventor(s) Henry W. Bonk and Tilak M. Shah

It is certified that error appears in the above-identified patent and that said Letters Patent are hereby corrected as shown below:

Column 16, Claim 13, line 56:    Should read:

claim 13                          claim 12

Column 16, Claim 14, line 59:    Should read:

claim 13                          claim 12

Signed and Sealed this

Nineteenth Day of August 1980

[SEAL]

Attest:

SIDNEY A. DIAMOND

Attesting Officer    Commissioner of Patents and Trademar